United States Patent Office 2,813,777
Patented Nov. 19, 1957

2,813,777

PROCESS FOR THE CRYSTALLIZATION OF NITRATE FROM A NITRIC ACID SOLUTION OF CRUDE PHOSPHATE

Gunder Georg Ulrich Wasmuth Swensen, Heroya, near Porsgrunn, Norway, assignor to Norsk Hydro-Elektrisk Kvaelstofaktieselskab, Oslo, Norway No Drawing. Application November 3, 1954, Serial No. 466,668

Claims priority, application Norway November 5, 1953

9 Claims. (Cl. 23—102)

It is known to convert crude phosphates into soluble form by treatment with nitric acid, a solution being obtained which contains calcium nitrate, free phosphoric acid and some excess nitric acid. Most of the calcium nitrate is then caused to crystallize out by cooling the decomposition liquid, whereupon the crystallized nitrate is separated from the mother liquor.

Crude phosphate generally contains rather large quantities of impurities which are insoluble in nitric acid. These insoluble impurities are present in an extraordinarily fine form and give rise to such great difficulties in the technical application of the process that a satisfactory process involves in practice many problems. Attempts have been made to solve these problems in various ways. It has been proposed to filter off these fine insoluble impurities while the decomposition liquid is still warm, i. e. before crystallization takes place; however, it has been found that the solution is not suitable for filtration. The strong acid solution has, in the warm state, a highly corroding action on the apparatus and on the filter material, and moreover the filter clogs very quickly. The removal of the fine insoluble material by decantation, e. g. with the aid of Dorr apparatus, is likewise unsuitable. The impurities are so fine that it is very difficult to realize settling within a reasonable time and, moreover, this tedious operation has to be carried out without cooling the liquid, since it is not only important that the solution does not become too viscous but also that crystallization during the settling be prevented.

In view of these circumstances, it has been proposed to cool the decomposition liquid and to crystallize out the calcium nitrate without preliminary separation of the fine insoluble impurities. It is evident that it is not a simple matter to carry out such a process in a satisfactory manner since it is necessary to avoid contamination of the calcium nitrate, which separates out of the mother liquor, by the insoluble constituents of the crude phosphate. It has been tried to carry out the process without preliminary separation of impurities, by bringing the crystallization about in continuously operating apparatus, in order to obtain well developed calcium nitrate crystals. By employing relatively coarse filter cloth, or fine-meshed acid-resistant metal fabric, it was thought that the calcium nitrate crystals would remain behind on the filter cloth while the mother liquor and the insoluble impurities would pass through without clogging the filter.

However, experience with this known and heretofore-preferred process has shown that in the crystallization of nitrates, e. g. calcium nitrate tetrahydrate, from nitric acid solutions of crude phosphate, difficulties are always encountered in the filtration of the crystal suspension, in that the filter pores become clogged so that the filtering soon ceases.

A further defect of this continuous process is that the separated salt, separation of which takes place on the cool surfaces of the apparatus, is for readily understandable reasons difficult to remove without interfering with the continuous operation of the apparatus.

A primary object of the present invention is the embodiment of a process for overcoming the hereinbefore-outlined prior art defects and for making possible the carrying out of the process in practice in simple and entirely satisfactory manner. In accordance with this invention, the realization of this process and the solving of the extremely difficult filtration problem, depend upon imparting a closely predetermined grain size to the calcium nitrate crystals.

The present invention assures the passage of the fine insoluble impurities through the filter and prevents clogging of the latter by such impurities by the expedient of keeping the maximum grain size of the calcium nitrate crystals below about 2.0 mm., while avoiding the presence of grain sizes below 0.5 mm. Best results during filtration are obtained when the maximum grain size of the crystals in the crystal suspension is less than 2.0 mm., and at least 80% by weight of the crystals are of a grain size between 0.5 and 1.5 mm., preferably between 0.5 and 1.0 mm.

The invention is based upon the appreciation that, contrary to expectation, it is particularly the presence of very small crystals of a grain size between 0.1 and 0.2 mm., which gives rise to the filtration difficulties. The reason that the grain size of the calcium nitrate crystals is of such decisive significance may be that the very fine insoluble constituents readily form a cohesive mass or form a layer with the crystals when the latter are not of the proper size.

In accordance with the present invention, the aforesaid desirable grain sizes and grain size distribution are realized by carrying out the crystallization of the nitrate discontinuously instead of in the heretofore-employed continuous manner, and by initiating the crystallization for each batch by the addition of seed crystals during the time when the temperature of the solution is from 2 to 10° (C.) lower than the saturation temperature. The "saturation temperature" of the solution is that temperature at which the solution, due to cooling, attains saturation with respect to nitrate. This saturation temperature is dependent upon the concentration and quantity of the acid relative to the lime content of the crude phosphate.

It is not possible, in practice, to realize the aforesaid necessary grain sizes and grain size distribution, in a continuous process. Moreover, the discontinuous or batch mode of operation simultaneously avoids the aforesaid difficulties of removing the salt layer from the cool surfaces of the apparatus, since it is readily possible to remove the salt layer formed during the cooling by dissolving the same during the introduction of a new batch of material into the apparatus. The still uncooled solution of crude phosphate dissolves the salt layer (of e. g. $Ca(NO_3)_2 \cdot 4H_2O$) which has formed on the cool surfaces during the cooling of preceding batch.

Furthermore, in the process according to the invention, in order to achieve the desired crystal formation, the solution is moderately stirred during the cooling so that the formed crystals remain suspended in the mother liquor and do not settle to the bottom of the container. After the seed crystals have been added, the further cooling of the crystal suspension is restricted or controlled in such manner that the supersaturation does not exceed the value of the supersaturation at the time the seed crystals were added. The term "supersaturation" here refers to the content of dissolved nitrate in the liquor beyond the nitrate content at saturation.

The nitrate, the crystallization of which is particularly important in practice, is calcium nitrate tetrahydrate; however, the invention comprises also other nitrates. In the event that the solution contains ammonium ions, which is the case where for example an ammonium nitrate-containing nitric acid is employed for decomposing the calcium phosphate, the nitrate which crystallizes out is for example the double salt:

$$5Ca(NO_3)_2 \cdot NH_4NO_3 \cdot 10H_2O$$

As seed crystals, crystals are employed which contain chiefly calcium nitrate, for example calcium nitrate tetrahydrate, in as finely-divided a form as possible. A crystallization-initiating material which gives very good results is for example ordinary calcium nitrate dust. This dust which consists of $NH_4NO_3 \cdot 5Ca(NO_3)_2 \cdot 10H_2O$ in addition to $Ca(NO_3)_2 \cdot 2H_2O$ and anhydrous $Ca(NO_3)_2$, is very suitable for the seeding in the crystallization of calcium nitrate tetrahydrate, notwithstanding the fact that it does not contain the latter compound.

It is clear from the foregoing that it is the goal of the invention to obtain crystals which as far as possible have the same grain size, within the above-defined grain size limits. It is of importance to the realization of this result that use be made of seed crystals in an especially fine form, preferably in the form of a fine dust. In this connection, it is not the weight and grain size of the seed crystals which are decisive for a good crystallization result, but rather the number of grains of seed crystal per unit of crystallizing liquor, and for this reason the grain size of the seed crystals has to be as small as possible, since otherwise the weight of the seed crystals would be impractically large.

When operating according to the present invention, the obtained crystals are of approximately the same age, so to speak, and this is one reason why they are of approximately the same size.

The average grain size of the crystals in the crystal suspension can be regulated by varying the sub-cooling of the solution at the time the seed crystals are added. Lowering of the temperature at the time of addition of the seed crystals causes increase in the number of grains in the crystal suspension and, consequently, a decrease in the grain size, while conversely, raising of the temperature reduces the number of grains and increases the grain size.

The average grain size of the crystals in the crystal suspension can also be regulated by varying the number of grains of the seed crystals. Increasing this number results in a reduction of the grain size in the crystal suspension while, conversely, decreasing the number of grains of seed crystals results in an increase in the grain size in the crystal suspension. A correct selection of the sub-cooling temperature ("seeding temperature") is of greater importance for the average grain size of the crystal mass than is the selection of the number of grains of seed crystal, if the latter is employed in the form of dust. In the latter event, the quantity of seed crystal can be varied in the ratio of 1:5 without essentially affecting the filterability of the crystal mass.

The crude phosphate is treated with nitric acid which contains 50 to 65% by weight $HNO_3$. If it is desired to crystallize calcium nitrate tetrahydrate from the solution, the decomposition of the crude phosphate is advantageously effected with nitric acid which contains 55 to 60, preferably 58% $HNO_3$ by weight, and the seed crystals are added at a time when the temperature of the solution is preferably 4 to 7° centigrade lower than the saturation temperature.

The separation from the mother liquor of the nitrate which crystallizes out is effected by filtration through a coarse-meshed filter cloth, whereby a considerable portion of the fine insoluble impurities passes through together with the phosphoric acid-containing mother liquor. This particular method of separating the calcium nitrate from the mother liquor therefore is not based upon what is conventionally designated as filtration, but has rather to be regarded as a straining operation. This straining off is advantageously carried out on a rotary filter. The mesh width of the filter material is of such size that the nitrate crystals are retained thereby to the greatest possible extent without hindering the passage of the finely-divided insoluble impurities, i. e. the mesh width should be of the order of 0.3 to 0.5 mm.

The process accordng to the invention can be carried out with any of the known crude calcium phosphates, such for example as Morocco phosphate, Florida phosphate, Cola phosphate, etc.

Typical presently-preferred embodiments of the invention are set forth in the following illustrative examples.

Example 1

1000 parts by weight of Cola phosphate (CaO content: about 51:5% by weight) are brought into solution with 1400 parts by weight of $HNO_3$ in the form of nitric acid containing 55 to 60% by weight, preferably 58% by weight, of $HNO_3$. The solution is cooled to a temperature which is 4° centigrade lower than the saturation temperature of the solution, after which 0.5 part by weight of calcium nitrate dust is added. The solution is further cooled to a temperature which brings about the crystallization of the quantity of the calcium nitrate to be removed from the liquor. This end temperature can, in the case the tetrahydrate is being crystallized out, for example be 15° C.

A crystal mass with the following grain distribution is obtained:

| | Percent |
|---|---|
| Greater than 1.5 mm | 0 |
| 1.0–1.5 mm | 16 |
| 0.7–1.0 mm | 66 |
| 0.5–0.7 mm | 15 |
| 0.3–0.5 mm | 2 |
| 0.2–0.3 mm | 1 |
| Smaller than 0.2 mm | 0 |

The suspension is filtered through a coarse-meshed filter cloth with a mesh width (light aperture) of 0.3 to 0.5 mm. and a filtering area of about 0.01 m.² per kilogram of suspension. The pressure drop during the straining corresponds to 40–50 mm. Hg. The straining time is about 6 seconds, reckoned from the moment straining begins until the crystal mass becomes dry on the surface.

Example 2

The starting material and procedure are the same as in Example 1, except that 5 parts by weight of calcium nitrate dust are added.

There is obtained a crystal mass with the following grain distribution:

| | Percent |
|---|---|
| Greater than 1.0 mm | 0 |
| 0.7–1.0 mm | 69 |
| 0.5–0.7 mm | 22 |
| 0.3–0.5 mm | 6 |
| 0.2–0.3 mm | 2 |
| Smaller than 0.2 mm | 1 |

Employing the conditions set forth in Example 1, the straining time here is about 12 seconds.

This example demonstrates that an increase in the number of grains of seed crystals results in a reduction in grain size in the crystal suspension, with the result that the straining time increases.

Example 3

The starting material and procedure are the same as in Example 1, except that the solution is cooled to about 7° centigrade below saturation temperature, whereupon 0.5 part by weight of calcium nitrate dust is added.

A crystal mass of the following grain distribution is obtained:

| | Percent |
|---|---|
| Greater than 1.0 mm | 0 |
| 0.7–1.0 mm | 60 |
| 0.5–0.7 mm | 25 |
| 0.3–0.5 mm | 10 |
| 0.2–0.3 mm | 3 |
| Smaller than 0.2 mm | 2 |

Employing the conditions set forth in Example 1, the straining time is about 18 seconds.

This example demonstrates that an increase in the subcooling of the solution at the time the seed crystals are added results in a reduction in the grain size in the crystal suspension, with the result that the straining time increases.

*Example 4*

The starting material and procedure are the same as in Example 1, except that the solution is cooled to only about 1° centigrade lower than the saturation temperature, after which 0.5 part by weight of calcium nitrate dust is added.

A crystal mass is obtained which has the following grain distribution:

| | Percent |
|---|---|
| Greater than 1.5 mm | 20 |
| 1.0–1.5 mm | 33 |
| 0.7–1.0 mm | 27 |
| 0.5–0.7 mm | 12 |
| 0.3–0.5 mm | 5 |
| 0.2–0.3 mm | 2 |
| Smaller than 0.2 mm | 1 |

The maximum grain size is greater than 2.0 mm. and only 72% of the crystals have a grain size between 0.5 and 1.5 mm. The crystal mass is thus coarse-grained and non-uniform in grain size. Employing the conditions set forth in Example 1, no straining whatever can be effected, i. e. the mass can not be strained at all. This demonstrates that the solution was insufficiently subcooled at the time the seed crystals were added.

*Example 5*

Cola phosphate (CaO content: about 51.5% by weight) is continuously dissolved in nitric acid. The quantitative ratio, crude phosphate: $HNO_3$, as well as the acid strength, are the same as in Example 1. The solution passes continuously through a receptacle wherein the solution is maintained at a temperature which brings about the crystallization from the solution of the quantity of calcium nitrate to be removed. This temperature, in the case of the crystallization of tetrahydrate, can e. g. be 15° C.

A crystal mass with the following grain distribution is obtained:

| | Percent |
|---|---|
| Greater than 3.0 mm | 0 |
| 2.0–3.0 mm | 10 |
| 1.5–2.0 mm | 19 |
| 1.0–1.5 mm | 38 |
| 0.7–1.0 mm | 18 |
| 0.5–0.7 mm | 7 |
| 0.3–0.5 mm | 5 |
| 0.2–0.3 mm | 2 |
| Smaller than 0.2 mm | 1 |

This crystal mass has a relatively high average grain size and does not satisfy the requirement of uniform grain size. Under the conditions set forth in Example 1, the suspension is found to be wholly unsuitable for straining.

*Example 6*

The present example exemplifies the crystallization out of the compound $NH_4NO_3 \cdot 5Ca(NO_3)_2 \cdot 10H_2O$, which is formed when the nitric acid used contains ammonium ions.

1000 parts by weight of Cola phosphate is brought into solution by means of 2300 parts by weight of nitric acid containing 61% by weight $HNO_3$ and 7% by weight of $NH_4NO_3$. The solution is cooled to a temperature which is 5° centigrade below saturation temperature, whereupon 0.5 part by weight of calcium nitrate dust is added. The solution is then further cooled to a temperature—e. g. about 20–25° C.—at which the quantity of double salt to be removed separates out.

A crystal mass is obtained which has a grain distribution and straining properties like that obtained in Example 1.

Having thus disclosed the invention, what is claimed is:

1. The process for the crystallization of a salt selected from the group consisting of calcium nitrate tetrahydrate and calcium nitrate-ammonium nitrate decahydrate from a solution of crude calcium phosphate in nitric acid, which comprises cooling the solution to a temperature ranging from 2 to 10 degrees centigrade below its saturation temperature, adding thereto calcium nitrate containing seed crystals, allowing the solution to cool further to yield crystals of which the main body has a grain size less than about 2 mm. and of which at least 80 percent by weight is of a grain size between 0.5 and 1.5 mm., and separating the crystals from the mother liquor and the finely divided impurities contained therein by straining through a coarse-meshed filtering material.

2. The process for the crystallization of calcium nitrate tetrahydrate from a solution of crude calcium phosphate in nitric acid, which comprises cooling the solution to a temperature ranging from 4 to 7 degrees centigrade below its saturation temperature, adding thereto calcium nitrate containing seed crystals, allowing the solution to cool further to yield crystals of which the main body has a grain size less than about 2 mm. and of which at least 80 percent by weight is of a grain size between 0.5 and 1.5 mm., and separating the crystals from the mother liquor and the finely divided impurities contained therein by straining through a coarse-meshed filtering material.

3. The process of claim 1 wherein the seed crystals are added in the form of finely divided dust.

4. The process of claim 2 wherein the seed crystals are added in the form of finely divided dust.

5. The process of claim 1 wherein the nitric acid contains from about 50 to about 65 percent by weight of $HNO_3$.

6. The process of claim 2 wherein the nitric acid contains from about 55 to about 60 percent by weight of $HNO_3$.

7. The process of claim 2 wherein the nitric acid contains about 58 percent by weight of $HNO_3$.

8. The process of claim 1 wherein the crystals are separated from the mother liquor by straining through a filter material having a mesh width of the order of 0.3 to 0.5 mm.

9. The process of claim 1 wherein the solution of crude calcium phosphate in nitric acid contains ammonium ions to yield crystals of calcium nitrate-ammonium nitrate decahydrate.

References Cited in the file of this patent

UNITED STATES PATENTS

| 1,816,285 | Johnson | July 28, 1931 |
| 1,976,283 | Johnson | Oct. 9, 1934 |
| 2,573,516 | Van Der Molen | Oct. 30, 1951 |